Jan. 6, 1959   F. P. MERRELS   2,867,418
SELECTIVE DISPENSING APPARATUS
Filed March 9, 1956   2 Sheets-Sheet 1
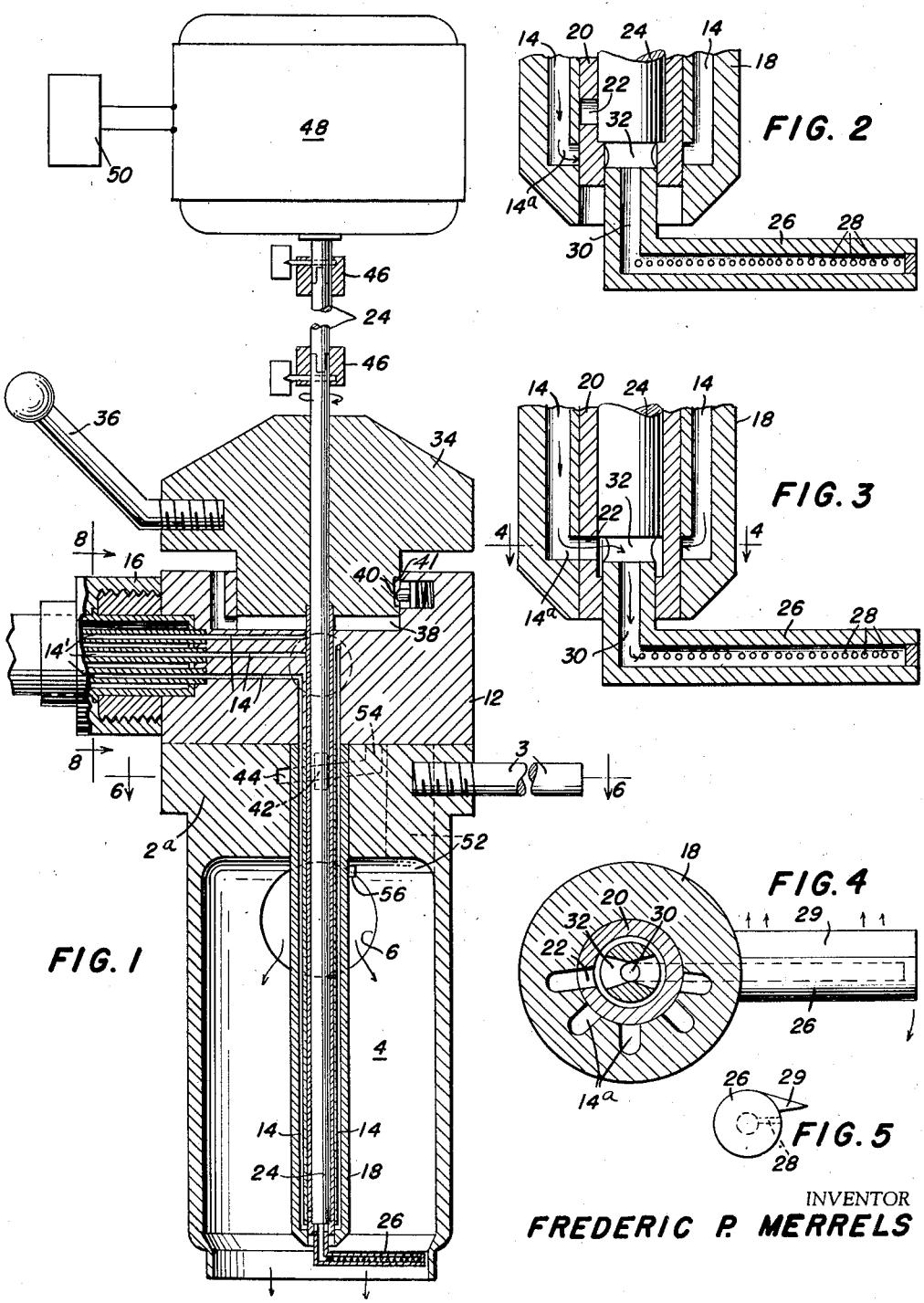
INVENTOR
FREDERIC P. MERRELS
BY *Fisher & Christen,*
ATTORNEYS Jan. 6, 1959  F. P. MERRELS  2,867,418
SELECTIVE DISPENSING APPARATUS
Filed March 9, 1956  2 Sheets-Sheet 2

INVENTOR
FREDERIC P. MERRELS
BY Fisher & Christen,
ATTORNEYS

United States Patent Office 2,867,418
Patented Jan. 6, 1959

2,867,418

SELECTIVE DISPENSING APPARATUS

Frederic P. Merrels, Silver Spring, Md.

Application March 9, 1956, Serial No. 570,584

12 Claims. (Cl. 259—8)

This invention is an apparatus for selectively dispensing any one of a plurality of differently flavored edible materials, as controlled by the setting of a flavor selector handle or indicator.

The invention will be described particularly in connection with dispensing soft ice cream, sherbet, frozen custard, soft ice milk and the like, although it could be used for dispensing other edible materials, such as soft drinks, for which it may be adapted.

The taste of the purchasing public for different flavored ice creams varies considerably and presents the problem to the retailer of the quantity of the several flavors to keep on hand. According to the present invention, the retailer keeps on hand a relatively large supply of ice cream or the like of a mild or neutral flavor, and then prepares on the spot a particular flavored cream as demanded by the customer.

The principal objects of the invention are:

To provide an apparatus which will prepare and dispense a pluarlity of ice creams of different flavors, in accordance with the manual setting of a flavor selector.

To provide an apparatus for dispensing ice creams of different flavors, wherein only a single supply of neutral flavor soft ice cream is kept on hand, this cream being passed into a mixing and dispensing chamber where it is mixed with a selected flavor as requested by the customer.

To provide an apparatus in which the mixing of ice cream and flavor takes place primarily at the discharge end of a mixing or spout chamber, so that there is substantially no residue of that flavor remaining after each operation, which residue, if in any substantial amount, would be undesirable when a change is made to another flavor.

More particularly, the invention comprises a mixing or spout chamber into the upper part of which is fed soft ice cream of a neutral or mild flavor, such as vanilla. A plurality of flavor carrying pipes extend downwardly centrally through this chamber and by a selector mechanism, one of these flavor pipes is selectively connected to a rotating nozzle. The several flavor pipes are under a slight pneumatic or hydraulic pressure, so that when a selected flavor is delivered to the rotating nozzle, such flavor is squirted into the ice cream and thoroughly intermixed therewith, due to the rotation.

The nozzle comprises essentially a substantially horizontal motor driven rotating arm, moving in a plane at the exit of the mixing chamber, so that there is little or no residue of a particular flavor remaining after each operation. The rotating nozzle is at the lower end of a vertical shaft, to the upper end of which a motor is detachably connected.

The invention further comprises a selector handle for the flavor and a spout handle for controlling the input of the neutral cream. An important feature of the invention is a vertically positioned selector pipe, which is moved in two directions; it is moved about a vertical axis, to line up a flavor receiving hole therein with a particular flavor pipe; it is moved longitudinally; that is, vertically downwardly bringing the flavor receiving hole into actual registry with a flavor pipe. The movement about the vertical axis is controlled by a flavor selector handle; the longitudinal movement is controlled by a spout handle which, when moved, moves the selector pipe longitudinally into actual registry with a flavor pipe. When this is done, the flavor passes into the rotating nozzle and so mixes with the neutral flavor cream.

The apparatus could also be used for dispensing different colored paints, wherein different paint pigments are selectively mixed with a white or neutral base paint.

Other features of structure and operation will be described in connection with the following drawings, illustrating the preferred way of carrying out the invention.

In these drawings:

Fig. 1 is a vertical cross section of the apparatus of this invention.

Fig. 2 is a vertical cross section on an enlarged scale, of the mixing nozzle and cooperating parts, before a flavor passage is in registry.

Fig. 3 is a view similar to Fig. 2 with a flavor passage in registry with the mixing nozzle.

Fig. 4 is a section on line 4—4 of Fig. 3.

Fig. 5 is a view of a detail of the nozzle.

Figure 6:
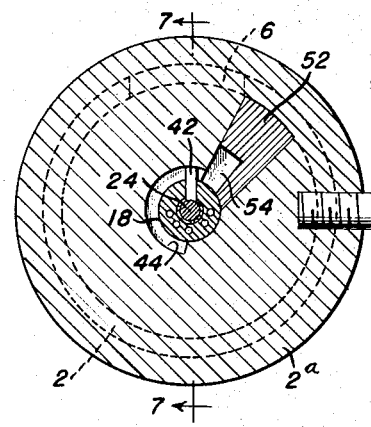
Fig. 6 is a section on an enlarged section line 6—6 of Fig. 1.
Figure 7:
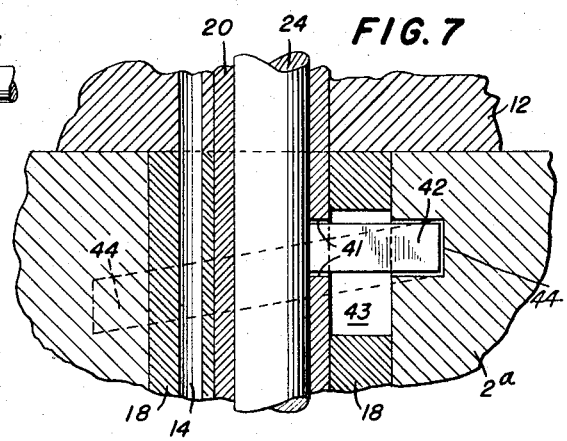
Fig. 7 is an enlarged section on line 7—7 of Fig. 6.

Referring now to these drawings, the mixing chamber 2 provides a space 4 for receiving soft ice cream to be flavored, through inlet 6. Chamber 2 is swiveled and supported in an annular bracket 8 mounted on freezer or reservoir 10 for the soft, neutral flavor ice cream. Chamber 2 has an annular shoulder 9 with rests on the top edge of bracket 8. Mixing chamber 2 is provided with a handle 3 for turning it back and forth to bring its inlet 6 into and out of registry into the pipe 11 from reservoir 10, for supplying and shutting off soft ice cream from freezer 10.

Figure 8:
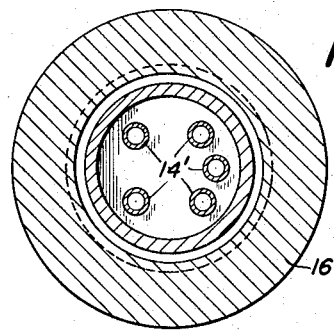
Fig. 8 is a section on line 8—8 of Fig. 1.

Mounted just above the chamber 2 is the body portion 12, which is anchored in place by bracket 13 to reservoir 10; this body 12 is provided with a plurality of flavor supplying pipes 14, which are arranged to be coupled to a corresponding plurality of flavor inlet pipes 14', which supply the various flavors under a slight pressure from suitable containers, not shown, to flavor pipes 14. Inlet pipes 14' are mounted in a coupling head 16 with a plug-in type of connection, of the general type used in radio tubes, as in Fig. 8, so that the pipes 14 and 14' can be plugged together in only one, and proper, way.

The flavor pipes 14 pass into the central part of the body 12, then pass downwardly into the flavor pipe housing 18. As shown in Fig. 4, five flavor pipes 14 are shown, by way of example; more or less could be used. These flavor pipes are circumferentially and radially arranged, as shown. Each flavor pipe is provided with an exit opening 14a, Fig. 2.

*Flavor selector pipe*

Centrally mounted in housing 18 is the flavor selector pipe 20, having a single inlet opening 22. Rotatably mounted in selector pipe 20 is a supporting and driving shaft 24 for a horizontally extending nozzle 26 having flavor delivery holes 28. The nozzle may be provided with a shield 29, Fig. 5, for preventing clogging and aiding in mixing. Shaft 24 is reduced to provide an annular space 30 and communicating openings 32 in turn communicating with the interior 30 of the nozzle.

When inlet 22 in selector pipe 20 is in registry with an opening 14a of a particular flavor pipe 14, as in Fig. 3, a selected flavor is delivered to the nozzle 26.

To move the flavor selector pipe 20 from its closed position of Fig. 2 to its operative position of Fig. 3, it is moved first laterally, about a vertical axis in accordance with the flavor selected and is then moved up or down, that is, vertically, for final registration of the openings as in Fig. 3. These two movements will now be described.

The lateral or flavor selecting movement is achieved by mounting the upper part of flavor selector pipe 20 in a flavor selector head 34 having a flavor selector handle 36. Selector head 34 is swiveled in a recess 38 in body member 12, a spring operated detent 40 being provided, detachably engageable with any one of a series of vertical slots 41 in head 34, these slots 41 being so positioned that when detent 40 is engaged in one of these slots, opening 22 in flavor selecting pipe 20 is in line with a particular flavor dispensing opening 14a, five of such openings being shown in Fig. 4. This movement will bring inlet 22 of pipe 20 vertically above a selected flavor opening 14a as in Fig. 2, but not yet in registry therewith.

To bring the said openings into registry, flavor selector pipe 20 is moved vertically downwardly to the position of Fig. 3, as follows: Pipe 20 is provided with a laterally projecting cam or pin 42 carried in a hole 41 in 18; this cam 42 rides in a curved and diagonal cam slot 44 in the head 2a of member 2. When spout 4 is turned by its handle 3, flavor selctor pipe 20 is cammed downwardly from the position of Fig. 2 to that of Fig. 3 to bring the passages into final registry, and the selected flavor flows into the nozzle. This same turning movement of handle 3 simultaneously brings inlet 6 of chamber 4 into registry with supply pipe 11, for supplying soft ice cream or the like to chamber 4. This same movement preferably closes the starting switch 50 for the motor 48, although the switch could be actuated manually, if desired.

The upper end of the nozzle shaft 24 is detachably coupled by one or more conventional couplings 46 to a driving motor 48, the motor having preferably a reduction gear to drive shaft 24 and nozzle 26 at the desired speed.

For convenience of disassembly for cleaning or replacement, a removable wedge member 52, Fig. 6 is provided, having a cut-out 54 providing a space for removal of pin 42. Removable member 52, as shown in Fig. 1, extends far enough outwardly that 14 and 18 and nozzle 26 may be removed by lifting upwardly after head 12 and member 52 are removed to provide the necessary clearance.

Figure 10:
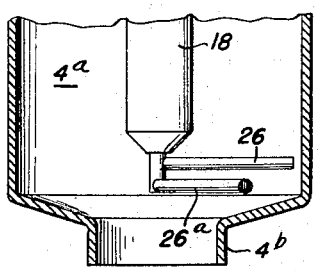
Fig. 10 is a detail showing certain modifications.
Figure 9:
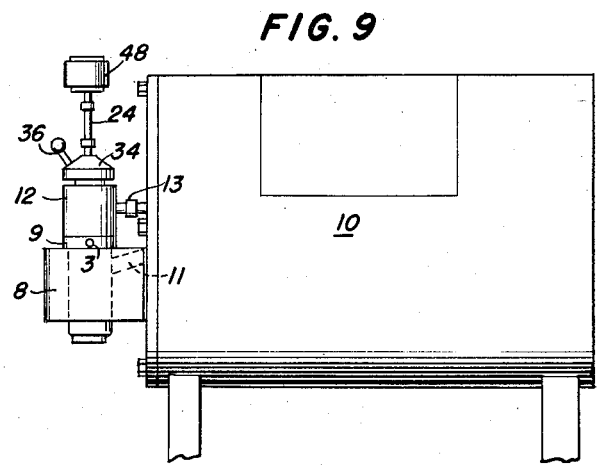
Fig. 9 is a side view of the apparatus as installed.

With the modification shown in Fig. 10, chamber 4a may have a more restricted outlet 4b, if desired, where the materials being mixed are more fluid. Also, an additional nozzle 26a may be provided, if desired, rotating with 26, but at a lower level, and preferably at about a 30° to 60° angle to 26. These nozzles may also rotate in a zone having a diameter greater than outlet 4b.

Summary of operation

With the flavor pipes 14 and 14' coupled together, selector handle 36 is moved laterally to select the desired flavor, spring detent 40 snapping into the appropriate recess to hold it in place. This moves flavor selector pipe 20, Fig. 2 in vertical alignment with the delivery end 14a of a selected flavor pipe 14. To bring the passages into fluid registry, as in Fig. 3, the spout or chamber handle 3 is moved laterally, causing cam 42 to cam pipe 20 downwardly to the position of Fig. 3. The selected flavor, under suitable pressure, then passes into passages 30 and 32 and thence into the nozzle and out of holes 28 to be mixed, as the nozzle is rotated by the motor 48. This movement of spout handle 3 simultaneously brings inlet 6 into registry with the delivery pipe 11 so that soft ice cream is also delivered to the chamber 4. The soft, neutral ice cream from reservoir 10 is under sufficient pressure to flow into 4.

As the nozzle 28 rotates, it delivers the flavor into the soft cream and thoroughly mixes it, so that the flavored ice cream is delivered at the lower end of 4. The nozzle 28, or nozzles 28 and 28a, are at or very near the delivery end of 4, so that when the operation is stopped, there is little or no flavored material remaining in 4, which might not be desirable in shifting to another flavor. Reverse movement of handle 3 stops the operation, motor 48 being stopped manually or automatically, as desired.

While the invention has been described in connection with the mixing and dispensing of ice cream in selected flavors, it could be used for mixing and dispensing other viscous or fluid materials, such as differently flavored beverages, or differently colored paints. In the case of paints, reservoir 10 would contain a neutral color paint, such as white and differently colored pigments would be selectively supplied by the nozzle 28.

While the preferred embodiment of the invention has been described in detail, it should be mentioned that the invention is not limited to these precise details, but may be carried out in other ways.

I claim as my invention:

1. Apparatus for mixing and dispensing any one of a plurality of selected flavors of ice cream and similar materials, comprising a receiving and mixing chamber having a discharge opening at the bottom end thereof, means for delivering ice cream of a neutral flavor to the upper part of said chamber, a flavor dispensing and mixing nozzle mounted for rotation substantially in said discharge opening and means including a plurality of flavor pipes, and a manually settable head for selectively and individually coupling a desired flavor pipe with said nozzle, for delivering a selected flavor to said nozzle for mixing with said neutral ice cream, whereby substantially all the ice cream mixed with the selected flavor is dispensed at each operation.

2. Apparatus for selectively dispensing multiple flavored materials, comprising a receiving chamber for a body of neutral material, a plurality of radially and vertically disposed flavor pipes in said receiving chamber, each having an exit opening adapted to deliver its respective flavor toward a common central zone, a seletcor pipe variably positionable in said central zone and having a flavor receiving opening adapted to be brought into selective registry with the exit from a particular flavor pipe, manually operated means for moving the selector pipe about a vertical axis to select a particular flavor, and manually operated means for moving said selector pipe longitudinally into registry with a selected flavor exit opening for delivery of flavor to said common central zone.

3. The combination of claim 2 further including a nozzle rotatable on a vertical axis and positioned near the lower end of said receiving chamber, said nozzle being in communication with said common central zone to receive flavor therefrom and to deliver and mix said flavor into the neutral material just as it leaves the lower end of said receiving chamber, whereby substantially all of the flavored material will be dispensed at each operation.

4. The combination of claim 3 further including a vertical shaft positioned inside said selector pipe and secured to the upper part of said rotatable nozzle, said shaft extending out of the top of the apparatus, and a motor operatively connected with the upper end of said vertical shaft.

5. Apparatus for selectively dispensing multiple flavored material, comprising a receiving chamber for a body of neutral material, a plurality of radially and vertically disposed flavor pipes in said receiving chamber, each having an exit opening adapted to deliver its respective flavor toward a comomn central zone, a selector pipe variably positionable in said central zone and having a flavor receiving opening adapted to be brought into selective registry with the exit from a particular flavor pipe, manually operated means for moving the selector pipe about a vertical axis to select a particular flavor, and manually operated means, including a spout handle, for moving said selector pipe longitudinally into registry with a selected flavor exit opening and for admitting neutral material into said receiving chamber.

6. The combination of claim 5, further including a nozzle rotatable on a vertical axis and positioned near the lower end of said receiving chamber, said nozzle being in communication with said common central zone to receive flavor therefrom and to deliver and mix said flavor into the neutral material just as it leaves the lower end of said receiving chamber, whereby substantially all of the flavored material will be dispensed at each operation.

7. The combination of claim 6, further including a vertical shaft positioned inside said selector pipe and secured to the upper part of said rotatable nozzle, said shaft extending out of the top of the apparatus, and a motor operatively connected with the upper end of said vertical shaft.

8. Apparatus for selectively dispensing multiple flavored materials, comprising a mixing chamber having a discharge opening at the lower end thereof, a plurality of radially arranged flavor pipes extending vertically and centrally through said mixing chamber substantially to the lower end thereof, a hollow rotatable mixer positioned in said discharge opening, means for coupling the upper ends of said flavor pipes to individual sources of different flavors, and means for selectively and individually coupling the lower ends of said flavor pipes to said hollow mixer.

9. The combination of claim 8, wherein the means for selectively and individually coupling the lower ends of said flavor pipes to said hollow mixer comprises a centrally positioned selector pipe, a manually movable selector head movable about a vertical axis for moving said selector pipe about a vertical axis, and manually operated means for moving said central selector pipe vertically.

10. The combination of claim 9, wherein said mixing chamber is rotatable on a vertical axis and is provided with an inlet for material of a neutral flavor and wherein said manually operable means of said claim also moves said mixing chamber about a vertical axis to bring said inlet into registry with a source of supply for the mixing chamber.

11. Apparatus for mixing and dispensing any one of a plurality of selected flavors of ice cream and similar materials, comprising a receiving and mixing chamber, means for delivering neutral ice cream to the upper part of said chamber, a flavor dispensing and mixing nozzle mounted for rotation in said chamber, means for rotating said nozzle, means for delivering a selected flavor to said nozzle under sufficient pressure to intermix such flavor with the neutral material as it passes downwardly and out of said chamber, said last mentioned means including a plurality of flavor pipes having openings into a common zone, and a variably positionable selector pipe having an opening adapted to register with only one of said openings at a time, for admitting a selected flavor to said common zone, said rotating nozzle being connected to said common zone for receiving a particular selected flavor.

12. Apparatus for mixing and dispensing any one of a plurality of selected flavors of ice cream and similar materials, comprising a receiving and mixing chamber, means for delivering neutral ice cream to the upper part of said chamber, a flavor dispensing and mixing nozzle mounted for rotation in said chamber, means for rotating said nozzle, and means for delivering a selected flavor to said nozzle under sufficient pressure to intermix such flavor with the neutral material as it passes downwardly and out of said chamber, said means for delivering a selected flavor to said nozzle including a plurality of flavor pipes having openings arcuately arranged around a common zone, and further including a variably positionable selector pipe having an opening adapted to register with only one of said flavor pipes at a time to admit one flavor into said common zone, and wherein the means for delivering neutral ice cream to the upper part of the chamber also serves to move said variably positionable pipe longitudinally as part of the flavor selecting operation.

References Cited in the file of this patent

UNITED STATES PATENTS

| | | |
|---|---|---|
| 2,473,035 | Meade et al. | June 14, 1949 |
| 2,736,534 | Atkins | Feb. 28, 1956 |

FOREIGN PATENTS

| | | |
|---|---|---|
| 888,432 | France | Dec. 13, 1943 |